United States Patent
Kim et al.

(10) Patent No.: US 10,621,422 B2
(45) Date of Patent: Apr. 14, 2020

(54) METHOD AND APPARATUS FOR GENERATING FACIAL EXPRESSION AND TRAINING METHOD FOR GENERATING FACIAL EXPRESSION

(71) Applicant: SAMSUNG ELECTRONICS CO., LTD., Suwon-si (KR)

(72) Inventors: Youngsung Kim, Suwon-si (KR); Byungin Yoo, Seoul (KR); Youngjun Kwak, Seoul (KR); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 15/672,393

(22) Filed: Aug. 9, 2017

(65) Prior Publication Data

US 2018/0173942 A1 Jun. 21, 2018

(30) Foreign Application Priority Data

Dec. 16, 2016 (KR) .................. 10-2016-0172547

(51) Int. Cl.
| | | |
|---|---|---|
| *G06K 9/00* | (2006.01) | |
| *G06K 9/62* | (2006.01) | |
| *G06T 13/40* | (2011.01) | |
| *G10L 21/06* | (2013.01) | |
| *G10L 15/00* | (2013.01) | |
| *G10L 21/10* | (2013.01) | |

(52) U.S. Cl.
CPC .......... *G06K 9/00302* (2013.01); *G06K 9/62* (2013.01); *G06K 9/627* (2013.01); *G06T 13/40* (2013.01); *G10L 21/06* (2013.01); *G10L 15/00* (2013.01); *G10L 2021/105* (2013.01)

(58) Field of Classification Search
None
See application file for complete search history.

(56) References Cited

U.S. PATENT DOCUMENTS

| | | |
|---|---|---|
| 8,437,514 B2 | 5/2013 | Wen et al. |
| 8,902,232 B2 | 12/2014 | Debevec et al. |
| 9,036,018 B2 | 5/2015 | Wang et al. |
| 2010/0134487 A1 | 6/2010 | Lai et al. |

FOREIGN PATENT DOCUMENTS

| | | |
|---|---|---|
| JP | 4733318 B2 | 7/2011 |
| KR | 10-0860989 B1 | 9/2008 |
| KR | 10-0935482 B1 | 1/2010 |

(Continued)

OTHER PUBLICATIONS

Abboud, Bouchra; et al. "Facial Expression Recognition and Synthesis Based on an Appearance Model." Signal Processing: Image Communication 19 (2004) 723-740. May 3, 2004.*

(Continued)

*Primary Examiner* — Fred H Hu
(74) *Attorney, Agent, or Firm* — NSIP Law

(57) ABSTRACT

A method and apparatus for generating a facial expression may receive an input image, and generate facial expression images that change from the input image based on an index indicating a facial expression intensity of the input image, the index being obtained from the input image.

21 Claims, 15 Drawing Sheets

(56) References Cited

FOREIGN PATENT DOCUMENTS

KR     10-0974293 B1     8/2010
KR     10-1549645 B1     9/2015

OTHER PUBLICATIONS

Terzopoulos, Demetri, and Keith Waters. "Analysis and synthesis of facial image sequences using physical and anatomical models." IEEE Transactions on Pattern Analysis and Machine Intelligence 15.6 (1993): 569-579.
Heylen, Dirk, Mannes Poel, and Anton Nijholt. "Generation of facial expressions from emotion using a fuzzy rule based system." Australian Joint Conference on Artificial Intelligence. Springer, Berlin, Heidelberg, (2001): 84-94.
Ghent, John, and John McDonald. "Photo-realistic facial expression synthesis." Image and Vision Computing 23.12 (2005): 1041-1050.
Belkin, Mikhail, Partha Niyogi, and Vikas Sindhwani. "Manifold regularization: A geometric framework for learning from labeled and unlabeled examples." Journal of machine learning research 7.Nov. 2006: 2399-2434.
Jang, Yong-Suk, et al. "3D Face Modeling based on 3D Morphable Shape Model." The Journal of the Korea Contents Association 8.1 (2008): 212-227.
Susskind, Joshua M., et al. "Generating facial expressions with deep belief nets." Affective Computing. InTech, (2008) 420-441.
Park, Tae-Hee. "The facial expression generation of vector graphic character using the simplified principle component vector." Journal of the Korea Institute of Information and Communication Engineering 12.9 (2008): 1547-1553.
Ramírez-Valdez, Leonel, and Rogelio Hasimoto-Beltran. "3D-facial expression synthesis and its application to face recognition systems." Journal of applied research and technology 7.3 (2009): 354-373.
Tsai, Yihjia, Hwei Jen Lin, and Fu Wen Yang. "Facial Expression Synthesis Based on Imitation." International Journal of Advanced Robotic Systems 9.4 (2012): 148.

* cited by examiner

400

METHOD AND APPARATUS FOR GENERATING FACIAL EXPRESSION AND TRAINING METHOD FOR GENERATING FACIAL EXPRESSION

CROSS-REFERENCE TO RELATED APPLICATION

This application claims the benefit under 35 USC § 119(a) of Korean Patent Application No. 10-2016-0172547 filed on Dec. 16, 2016, in the Korean Intellectual Property Office, the entire disclosure of which is incorporated herein by reference for all purposes.

BACKGROUND

1. Field

The following description relates to a method and apparatus for generating a facial expression and a training method for generating a facial expression.

2. Description of Related Art

A facial expression is formed by motions of facial muscles performed in response to neural stimulation. The facial expression is recognized by image processing with respect to visual clues extracted from an input image. A facial expression shown in the input image is obtained as facial expression information through detection of a landmark or detection of action units (Aus) of facial muscles to verify form information for each facial part.

When a few input images are provided, only a few items of facial expression information may be obtained from the input images, or precise facial expression information to identify a facial expression may not be detected. It is not easy to generate a new facial expression other than a facial expression that is already defined or to express an emotion with successive facial expressions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, that is provided a method of generating a facial expression including receiving an input image, obtaining an index indicating a facial expression intensity of the input image, and generating facial expression images, different from the input image, based on the index.

The input image may include a first facial expression.

The generating of the facial expression images may include generating the facial expression images to have facial expression intensities different from a facial expression intensity of the first facial expression based on the index.

The generating of the facial expression images may include generating the facial expression images with facial expression intensities that sequentially change from the facial expression intensity corresponding to the index using facial expression generators.

The facial expression generators may include forward-cascaded neural networks, and backward-cascaded neural networks.

The generating of the facial expression images may include generating facial expression images having facial expression intensities greater than the facial expression intensity based on neural networks corresponding to indices greater than the index among forward-cascaded neural networks, and generating facial expression images having facial expression intensities lesser than the facial expression intensity based on neural networks corresponding to indices lesser than the index among backward-cascaded neural networks.

The obtaining of the index may include any one or any combination of receiving the index, and determining the index.

The determining of the index may include recognizing a facial expression of the input image, and determining the index indicating a facial expression intensity corresponding to the recognized facial expression.

The determining of the index indicating the facial expression intensity may include extracting a facial expression feature of the recognized facial expression, calculating a facial expression variation between the facial expression feature and a facial expression feature of a reference image corresponding to the recognized facial expression, and estimating the index based on the facial expression variation.

The may include obtaining a switch index indicating a switch to a facial expression different from a facial expression of the input image, wherein the generating of the facial expression images may include generating the facial expression images based on the index and the switch index.

The facial expression images may include first facial expression images having different facial expression intensities corresponding to the facial expression of the input image, and second facial expression images having different facial expression intensities corresponding to another facial expression different from the facial expression of the input image.

The facial expression images have different facial expression intensities corresponding to facial expression changes between the facial expression and the another facial expression.

The method may include generating a video based on the facial expression images, and playing back the video.

In another general aspect, that is provided a training method for generating a facial expression, the training method including acquiring training images corresponding to different facial expression intensities, training, for each of the training images, a first neural network that generates a subsequent image having a facial expression intensity greater than a facial expression intensity of the corresponding training image, among forward-cascaded neural networks, and training, for each of the training images, a second neural network that generates a previous image having a facial expression intensity less than a facial expression intensity of the corresponding training image, among backward-cascaded neural networks.

The training of the first neural network may include generating input images by applying element-wise operations to an output image of a previous neural network of the first neural network, among the forward-cascaded neural networks, and the corresponding training image, and training neural networks sharing parameters based on the input images and a training image subsequent to the corresponding training image, among the training images.

The training of the second neural network may include generating input images by applying element-wise operations to an output image of a subsequent neural network of the second neural network, among the backward-cascaded neural networks, and the corresponding training image, and training neural networks sharing parameters based on the input images and a training image previous to the corresponding training image, among the training images.

In another general aspect, that is provided an apparatus for generating a facial expression, the apparatus including an input interface configured to receive an input image, and a processor configured to obtain an index indicating a facial expression intensity of the input image, and to generate facial expression images different from the input image, based on the index.

The processor may be configured to generate the facial expression images with facial expression intensities that sequentially change from the facial expression intensity corresponding to the index using facial expression generators, and the facial expression generators may include forward-cascaded neural networks and backward-cascaded neural networks.

The processor may be configured to generate facial expression images having facial expression intensities greater than the facial expression intensity based on neural networks corresponding to indices greater than the index among forward-cascaded neural networks, and to generate facial expression images having facial expression intensities lesser than the facial expression intensity based on neural networks corresponding to indices lesser than the index among backward-cascaded neural networks.

Other features and aspects will be apparent from the following detailed description, the drawings, and the claims.

Figure 1:
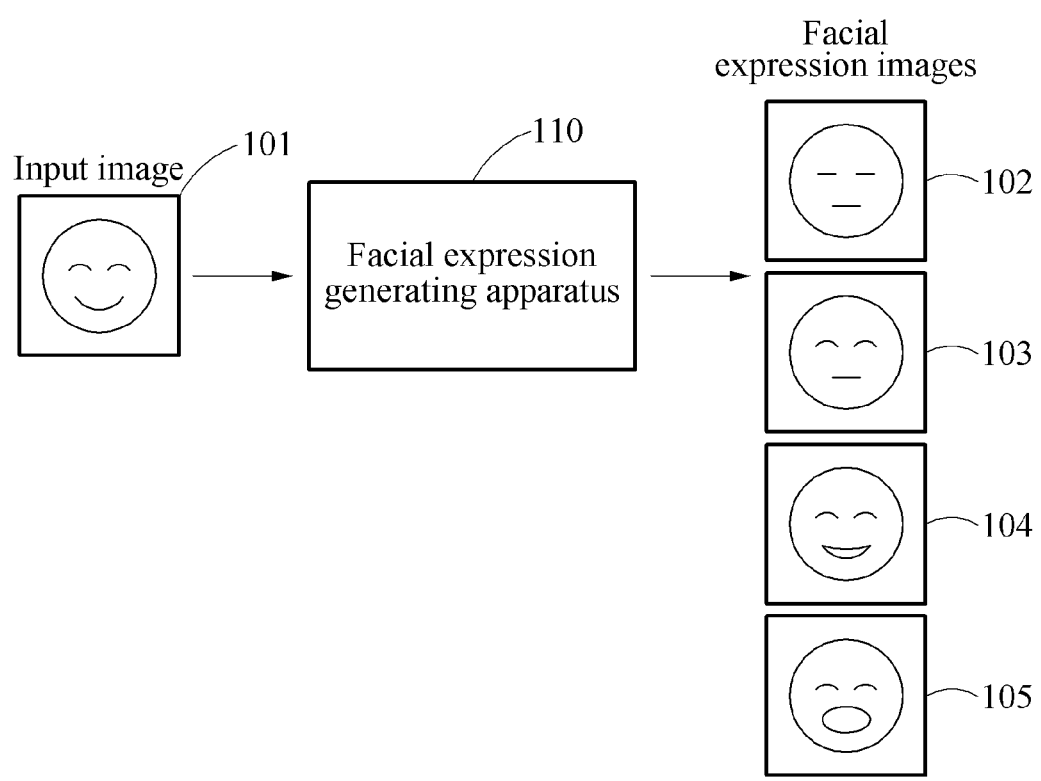
FIG. 1 illustrates an example of an operation of a facial expression generating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise.

FIG. 1 illustrates an example of an operation of a facial expression generating apparatus. Referring to FIG. 1, when an input image 101 is input, a facial expression generating apparatus 110 generates facial expression images 102, 103, 104, and 105 that change from the input image 101. In this example, the input image 101 is a single input image 101 representing a first facial expression.

The facial expression generating apparatus 110 generates first facial expression images 102, 103, 104, and 105 having facial expression intensities that are different from a facial expression intensity of the first facial expression. The first facial expression images 102, 103, 104, and 105 are first facial expression images having facial expression intensities that sequentially change based on an index indicating the facial expression intensity of the input image 101. In an example, the first facial expression images 102, 103, 104, and 105 include first facial expression images having forward facial expression intensities corresponding to indices that increase based on the index of the input image 101. In an example, the first facial expression images 102, 103, 104, and 105 include first facial expression images having backward facial expression intensities corresponding to indices that decrease based on the index of the input image 101.

An index is assigned based on a facial expression variation from a reference facial expression intensity (or a facial expression intensity of "0"). In an example, an index corresponding to each facial expression intensity is learned in advance.

For example, when the facial expression of the input image 101 is a smiling facial expression, and the index of the input image 101 is "2," an index of the facial expression image 102 is "0", an index of the facial expression image 103 is "1", an index of the facial expression image 104 is "3", and an index of the facial expression image 105 is "4".

In an example, the facial expression generating apparatus 110 generates smiling facial expression images 104 and 105 corresponding to indices "3" and "4" sequentially based on the index "2" of the input image 101. In an example, the facial expression generating apparatus 110 generates smiling facial expression images 103 and 102 corresponding to indices "1" and "0" in a backward direction based on the index "2" of the input image 101.

A change in facial expression between facial expression images is defined as expressed by Equation 1.

$$\tilde{x} = x + \varepsilon, \text{ wherein } \tilde{x}, x \in R^{h \times w} \quad \text{[Equation 1]}$$

In Equation 1, x denotes a current facial expression, and x̃ denotes a new (future) facial expression that changes from the current facial expression. ε denotes a facial expression variation corresponding to a difference between the current facial expression and the new facial expression. Further, $R^{h \times w}$ denotes a matrix having a size of h(height)×w(width) corresponding to sizes of x and x̃ in a real number domain R.

Equation 1 represents that the current facial expression x changes to the facial expression x̃ by the facial expression variation ε which is a latent factor. In this example, a distribution of the facial expression variation ε is modeled based on the difference between the two facial expressions. The facial expression variation ε is learned in an expression space (abstraction space).

Figure 2:
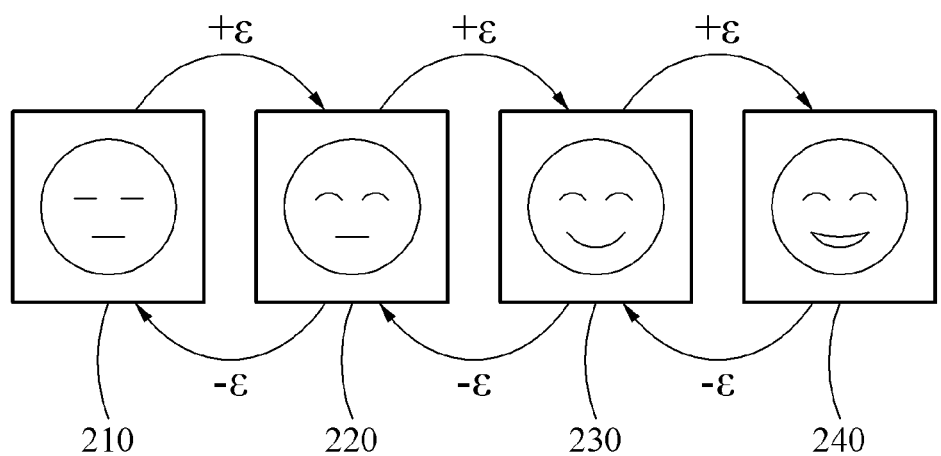
FIG. 2 illustrates examples of facial expression images generated from an input image.

FIG. 2 illustrates an example of facial expression images generated from an input image. Referring to FIG. 2, facial expression images 220, 230, and 240 having facial expression intensities that sequentially change by a predetermined facial expression variation ε from an impassive facial expression image (neutral facial expression image) 210 are illustrated. In this example, the facial expression variation ε is learned in advance using a number of successive facial expression images in a training operation.

As the facial expression variation ε is added to the impassive facial expression image 210, the facial expression image changes to a more smiling facial expression image having a greater facial expression intensity. A change in facial expression with respect to the facial expression images having facial expression intensities that sequentially change as described above is expressed by Equation 2.

$$x_{i+1} = x_i + \varepsilon_i, \text{ where } i=0,1,\ldots n. \quad \text{[Equation 2]}$$

In an example, an index indicating a different facial expression intensity based on the facial expression variation ε from the impassive facial expression image 210 is assigned to each facial expression image. For example, an index "0" is assigned to the impassive facial expression image 210, and an index "3" is assigned to the facial expression image 240 by adding a variation of 3ε to the facial expression intensity of the impassive facial expression image 210.

In an example, a facial expression generating apparatus generates facial expression images having facial expression intensities that sequentially change from a facial expression intensity corresponding to an index using facial expression generators. A structure and an operation of a facial expression generating apparatus including facial expression generators will be further described with reference to FIG. 3.

In an example, a facial expression variation between such facial expression images is determined in relation to various different facial expressions such as the smiling facial expression of FIG. 2, a crying facial expression, and an angry facial expression.

As set forth hereinafter, a facial expression generating apparatus learns a difference (facial expression variation) between various facial expression images in advance and generates facial expression images that change from a single input image.

Figure 3:
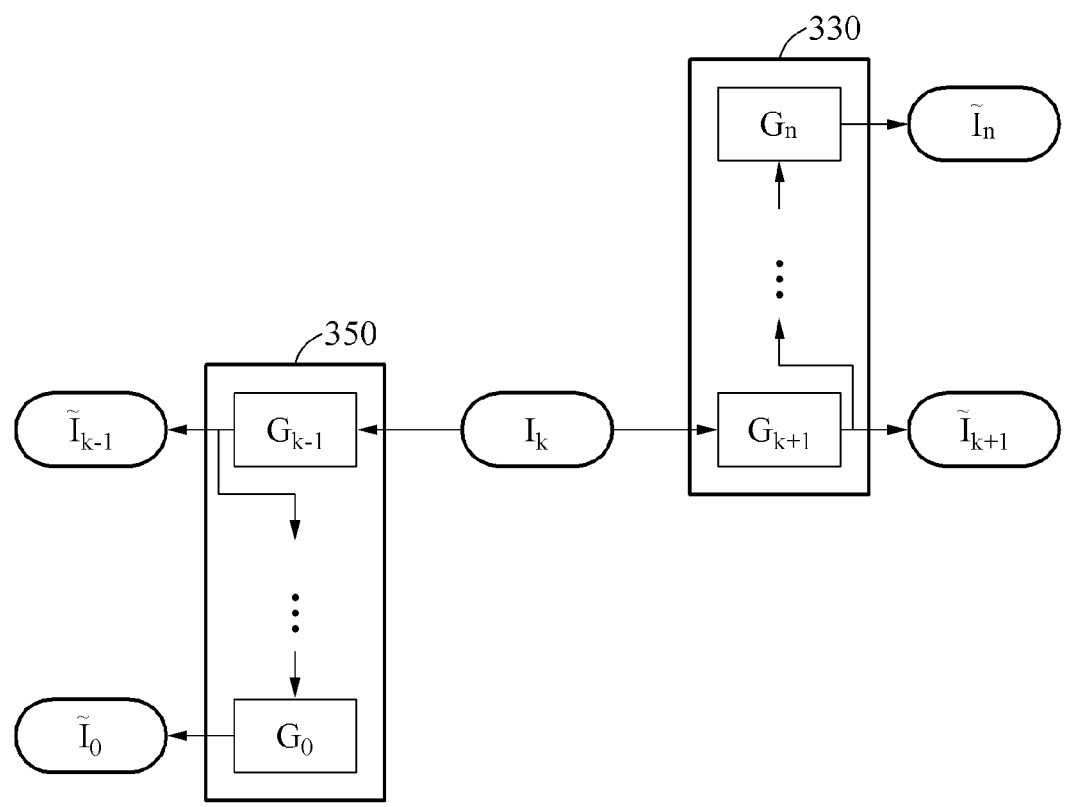
FIG. 3 illustrates an example of a structure and an operation of a facial expression generating apparatus that generates facial expression images from an input image.

FIG. 3 illustrates an example of a structure and an operation of a facial expression generating apparatus that generates facial expression images. Referring to FIG. 3, a facial expression generating apparatus 300 generates facial expression images having facial expression intensities that sequentially change from a facial expression intensity corresponding to an index k of an input image $I_k$ using a plurality of facial expression generators $G_o \ldots G_n$. In an example, facial expression generators that generate facial expression images having different facial expression intensities corresponding to a facial expression of the input image $I_k$ are selected based on the corresponding facial expression. In an example, a point at which generation of a facial expression image is to be initiated is determined among cascaded neural networks of the corresponding facial expression generators based on the facial expression intensity of the input image $I_k$, i.e., the index k of the input image $I_k$. Hereinafter, a facial expression generator and a neural network are construed as having the same meaning.

The facial expression generators include forward-cascaded neural networks 330 having indices that increase from the index k of the input image $I_k$, and backward-cascaded neural networks 350 having indices that decrease from the index k of the input image $I_k$.

The neural networks 330 generate facial expression images $\tilde{I}_{k+1}, \ldots \tilde{I}_n$ having facial expression intensities greater than the facial expression intensity of the input image $I_k$ from the input image $I_k$. Further, the neural networks 350 generate facial expression images $\tilde{I}_{k-1} \ldots \tilde{I}_1, \tilde{I}_0$ having facial expression intensities less than the facial expression intensity of the input image $I_k$ from the input image $I_k$.

In an example, the facial expression generating apparatus 300 generates facial expression images having facial expression intensities greater than the facial expression intensity of the input image $I_k$ based on neural networks corresponding to indices greater than the index of the input image $I_k$. In an example, the facial expression generating apparatus 300 generates facial expression images having facial expression intensities less than the facial expression intensity of the input image $I_k$ based on neural networks corresponding to indices less than the index of the input image $I_k$.

For example, when an input image is an image of an angry facial expression, facial expression generators that generate angry facial expression images are selected. When an index of the input image is "1", angry facial expression images corresponding to remaining indices "2", "3", . . . "N", except for the index "1", are sequentially generated.

The facial expression generators are trained by the cascaded neural networks to generate facial expression images corresponding to facial expression intensities that sequentially change from the facial expression intensity of the input image $I_k$. In an example, the facial expression generators learns in advance facial expression variations corresponding to the facial expression intensities of the facial expression images and the indices corresponding to the facial expression intensities. Each of the neural networks corresponds to an index indicating a facial expression intensity of a facial expression image generated by the corresponding neural network.

According to an example, the facial expression generating apparatus successively generates facial expression images that change from a single facial expression image input by the cascaded facial expression generators.

Figure 4:
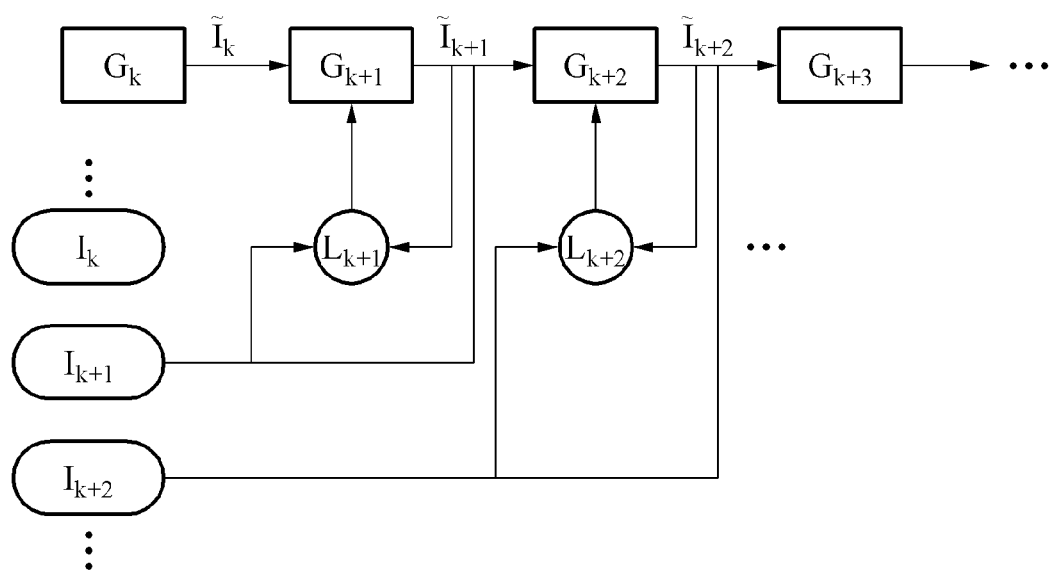
FIG. 4 illustrates an example of a process of training a facial expression generator of FIG. 3.

FIG. 4 illustrates an example of a process of training a facial expression generator of FIG. 3. Hereinafter, a process of a facial expression generating apparatus 400 learning facial expression images will be described based on an operation of a $(k+1)^{th}$ facial expression generator $G_{k+1}$, among a plurality of facial expression generators included in the facial expression generating apparatus 400.

In an example, the facial expression generator $G_{k+1}$ receiving a facial expression image $\tilde{I}_k$ generated by a $k^{th}$ facial expression generator $G_k$ from the $k^{th}$ facial expression generator $G_k$ generates a facial expression image $\tilde{I}_{k+1}$. The facial expression image $\tilde{I}_k$ is a facial expression image corresponding to an index k, and the facial expression image $\tilde{I}_{k+1}$ is a facial expression image corresponding to an index k+1.

The facial expression generator $G_{k+1}$ is trained in advance to minimize an error between an actual input image $I_{k+}$, corresponding to the index k+1 and the facial expression image $\tilde{I}_{k+1}$ generated by the facial expression generator $G_{k+1}$. In this example, a loss function $I_{k+1}$ that minimizes an error includes parameters learned in advance to minimize the error between the actual input image $I_{k+1}$ and the generated facial expression image $\tilde{I}_{k+1}$. In an example, the facial expression generator $G_{k+1}$ generates a subsequent facial expression image $\tilde{I}_{k+1}$ which is similar to the actual input image $I_{k+1}$ from the facial expression image $\tilde{I}_k$ using the loss function $L_{k+1}$.

Through the above process in the cascaded neural networks, the facial expression generating apparatus 400 generates facial expression images that successively change from a single input image.

Figure 5:
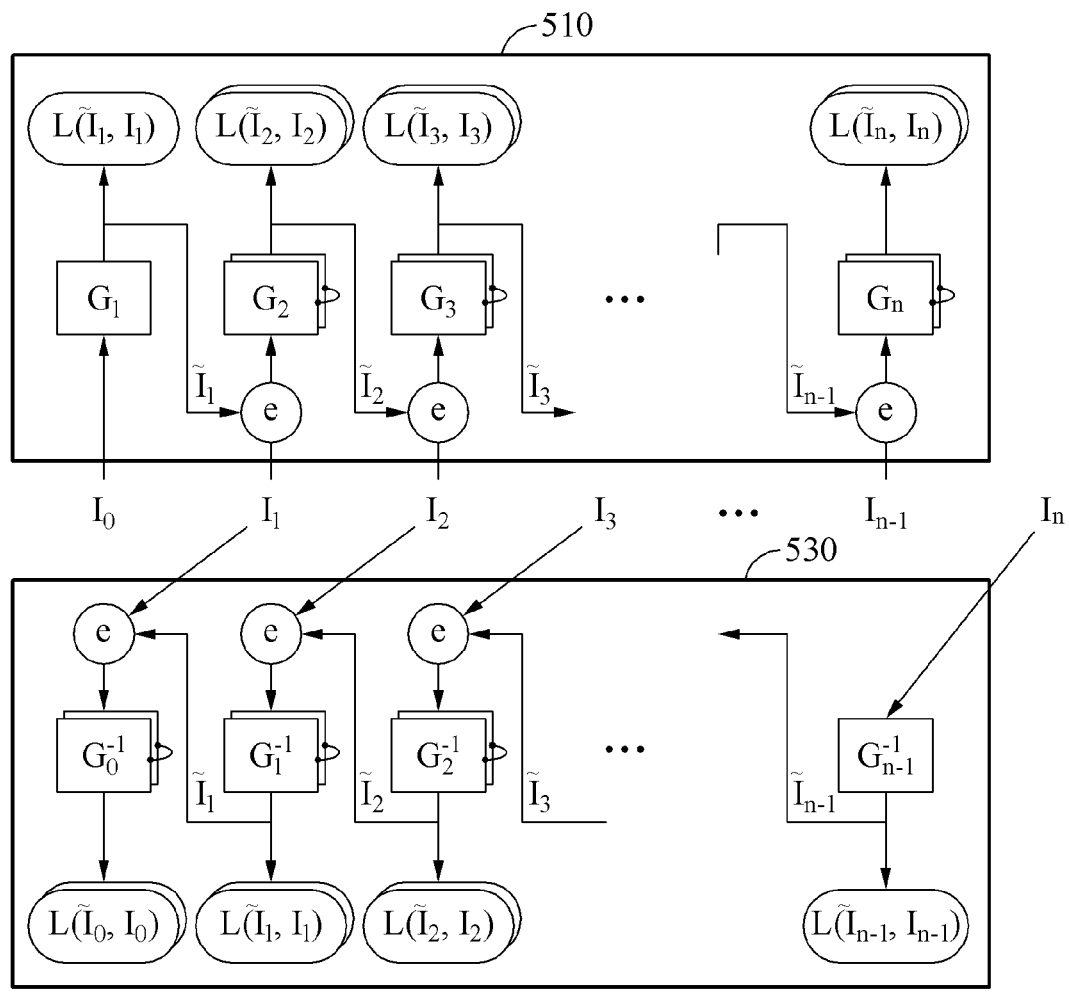
FIG. 5 illustrates an example of a structure and an operation of a training neural network for generating a facial expression.

FIG. 5 illustrates an example of a structure and an operation of a training neural network for generating a facial expression. Referring to FIG. 5, a training neural network 500 includes forward-cascaded neural networks 510 and backward-cascaded neural networks 530. In this example, $I_0, I_1, \ldots I_{n-1}, I_n$ denote training images of the training neural network 500. For example, the training images correspond to frame images of a video including a changing facial expression of a user. In FIG. 5, a line connecting facial expression generators that overlap each other indicates that parameters are shared between the facial expression generators.

Each of the facial expression generators $G_1, \ldots G_n$, and $G_0^{-1} \ldots G_{n-1}^{-1}$ of FIG. 5 may include an encoder configured using a neural network and a decoder configured using a neural network. For example, a facial expression generator including an encoder and a decoder trains a facial expression that changes from an input facial expression X as shown in the following process.

Each of the facial expression generators encodes a facial expression feature of a first facial expression through the encoder, and decodes the encoded facial expression feature through the decoder, thereby generating a second facial expression image synthesized from a first facial expression image.

Each of the facial expression generators encodes a facial expression feature of the input facial expression (first facial expression) through the encoder, and decodes the encoded facial expression feature through the decoder, thereby synthesizing a second facial expression that changes from the first facial expression. Each of the facial expression generators generates the second facial expression image by detecting a parameter that minimizes an error between the synthesized second facial expression and an actual second facial expression. The above process is expressed by Equation 3.

$$\underset{\theta,\theta'}{\mathrm{argmin}} E_{q(\tilde{x},x)}(\|x^r - \tilde{x}\|^2) \qquad \text{[Equation 3]}$$

In this example, h=encode(x) denotes an encoder parameter, and $x^r$=decode (h) denotes a decoder parameter. $E_q$ denotes a function that obtains an encoder-decoder hypothesis θ, θ' for changing the input facial expression X to a target facial expression $\tilde{x}$. The function $E_q$ assumes a distribution q in which x changes to $\tilde{x}$, and estimates transform to minimize an expected value of an error value between a variable changed by modeling and a target variable.

In an example, when the encoder parameter is h=encode(x)=σ(Wx+b)=σ(Wx+Wε+b), and the decoder parameter is $x^r$=decode(h)=W'h+c, Equation 3 is expressed as given by Equation 4. Here, σ denotes an activation function, W denotes a transformation parameter, and b and c each denote a bias.

$$\underset{W,W',b,c}{\mathrm{argmin}} E_{q(\tilde{x},x)}(\|x^r - \tilde{x}\|^2) = \qquad \text{[Equation 4]}$$
$$\underset{W,W',b,c}{\mathrm{argmin}} E_{q(\tilde{x},x)}(\|W'\sigma(Wx+b) + c - \tilde{x}\|^2)$$

Thus, a transform function f(x) is expressed by Equation 5.

$$f(g(x)) = f(\sigma(Wx+b)) \qquad \text{[Equation 5]}$$
$$= W'\sigma(Wx+b) + c = x^r$$

Further, the training neural network transforms a facial expression image to a facial expression special feature abstracted by a function g(x). For example, functions $f(\bullet)$ and $g(\bullet)$ are implemented as convolutional neural networks (CNNs), and $f(g(\bullet))$ is implemented as an auto-encoder (AE). Various other embodiments may be utilized. The function $f(g(\bullet))$ includes a loss function which will be described below.

The loss function L includes parameters learned in advance to minimize a loss (error) between an actual input image I and a generated facial expression image $\tilde{I}$. In an example, the loss includes a reconstruction loss and a contrastive loss between the actual input image I and the generated facial expression image $\tilde{I}$.

The neural networks 510 are each trained, for each of the training images, to generate a subsequent image having a facial expression intensity greater than a facial expression intensity of the corresponding training image. The neural networks 510 each generate input images by applying element-wise operations e to an output image $\tilde{I}_1, \tilde{I}_2 \ldots \tilde{I}_{n-2}, \tilde{I}_{n-1}$ of a previous neural network of the corresponding neural network and the corresponding training image $I_1, I_2 \ldots I_{n-2}, I_{n-1}$.

The neural networks 510 train neural networks that share parameters based on input images, and a subsequent training image of the corresponding training image. A method of the neural networks 510 training neural networks that share parameters will be described with reference to FIG. 6.

In an example, the neural networks 530 each generate a previous image having a facial expression intensity less than a facial expression intensity of the corresponding training image. The neural networks 530 each generate input images by applying element-wise operations to an output image $\tilde{I}_{n-1}, \tilde{I}_{n-2}, \ldots, \tilde{I}_2, \tilde{I}_1$ of a subsequent neural network of the corresponding neural network and the corresponding training image $I_{n-1}, I_{n-2}, \ldots, I_2, I_1$.

The neural networks 530 train neural networks that share parameters based on the input images, and a previous training image of the corresponding training image.

In an example, the first facial expression generator $G_1$ of the neural networks 510 and the $(n-1)^{th}$ facial expression generator $G_{n-1}^{-1}$, which is a previous facial expression generator of the maximum facial expression generator of the neural networks 530, are each a facial expression generator that do not share parameters with other facial expression generators. In this example, a loss function $L(\tilde{I}_1, I_1)$ corresponding to the first facial expression generator $G_1$ of the neural networks 510 and a loss function $L(\tilde{I}_{n-1}, I_{n-1})$ corresponding to the $(n-1)^{th}$ facial expression generator $G_{n-1}^{-1}$ of the neural networks 530 are each a single loss function.

Figure 6:
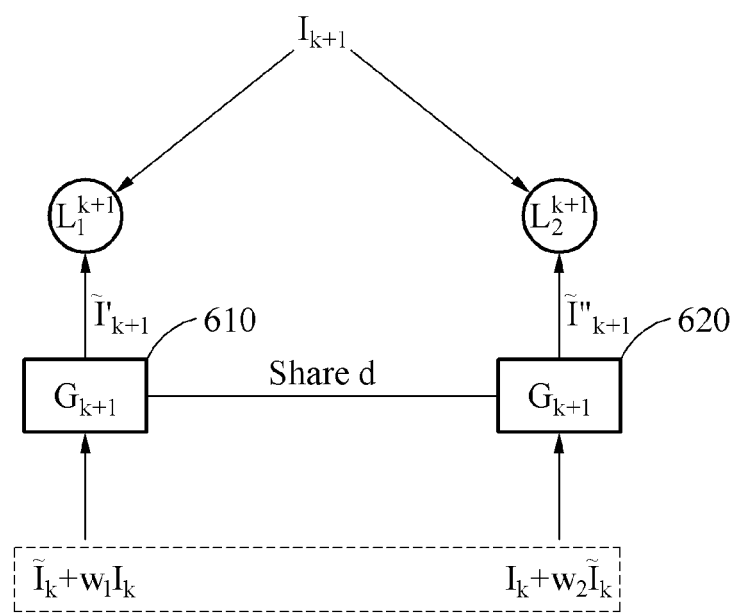
FIG. 6 illustrates an example of operations between facial expression generators that share parameters in the training neural network of FIG. 5.

FIG. 6 illustrates an example of operations between facial expression generators that share parameters in the training neural network of FIG. 5. Referring to FIG. 6, operations of facial expression generators $G_{k+1}$ that learn a facial expression image corresponding to an index k+1 are illustrated. The facial expression generators $G_{k+1}$ are pair generators that share parameters.

The facial expression generators $G_{k+1}$ apply element-wise operations e to an output image $\tilde{I}_k$ of a $k^{th}$ facial expression generator $G_k$, which is a previous facial expression generator of a $(k+1)^{th}$ facial expression generator, and a corresponding training image $I_{k+1}$. Results of the element-wise operations are shown in a box with dashed lines.

By the element-wise operations, $\tilde{I}_k+w_1 I_k$ is input into the facial expression generator $G_{k+1}$ 610, and $I_k+w_2\tilde{I}_k$ is input into the facial expression generator $G_{k+1}$ 620. $w_1$ and $w_2$ denote weight parameters, which are determined or set to values in a training operation.

The facial expression generator $G_{k+1}$ 610 receiving $I_k+w_1 I_k$ generates an image $\tilde{I}'_{k+1}$. Further, the facial expression generator $G_{k+1}$ 620 receiving $I_k+w_2\tilde{I}_k$ generates an image $\tilde{I}''_{k+1}$. In this example, a loss function $L_1^{k+1}$ of the facial expression generator $G_{k+1}$ 610 learns parameters to minimize an error between the training image $I_{k+1}$ and the generated image $\tilde{I}_{k+1}$. Further, a loss function $L_2^{k+1}$ of the facial expression generator $G_{k+1}$ 620 learns parameters to minimize an error between the training image $I_{k+1}$ and the generated image $\tilde{I}''_{k+1}$.

Figure 7:
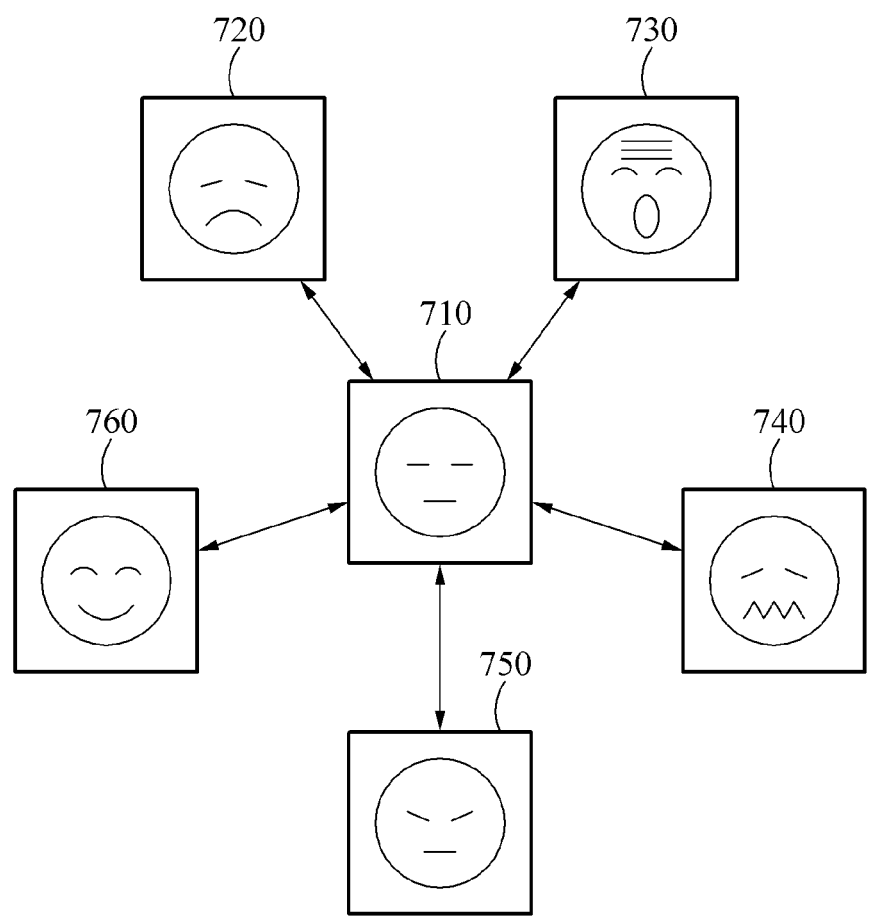
FIGS. 7 and 8 illustrate examples of facial expression images generated from an input image.

FIG. 7 illustrates an example of facial expression images generated from an input image. FIG. 7 depicts an impassive facial expression image 710, a sad facial expression image 720, an excited facial expression image 730, a depressed facial expression image 740, an angry facial expression image 750, and a smiling facial expression image 760.

A facial expression generating apparatus generates facial expression images having different facial expression intensities corresponding to a facial expression of an input image based on the facial expression of the input image. For example, based on the facial expression of the input image, the facial expression generating apparatus generates a plurality of angry facial expression images 750 that sequentially change from the impassive facial expression image 710, or generates a plurality of excited facial expression images 730 that sequentially change from the impassive facial expression image 710.

In this example, the facial expression generating apparatus generates facial expression images having facial expression intensities that sequentially change in forward and backward directions from a facial expression intensity corresponding to an index of the input image based on the index of the input image.

Although the facial expression images generated from the input image by the facial expression generating apparatus include the sad facial expression image 720, the excited facial expression image 730, the depressed facial expression image 740, the angry facial expression image 750, and the smiling facial expression image 760, examples are not limited thereto. Various other facial expression images may be generated.

Figure 8:
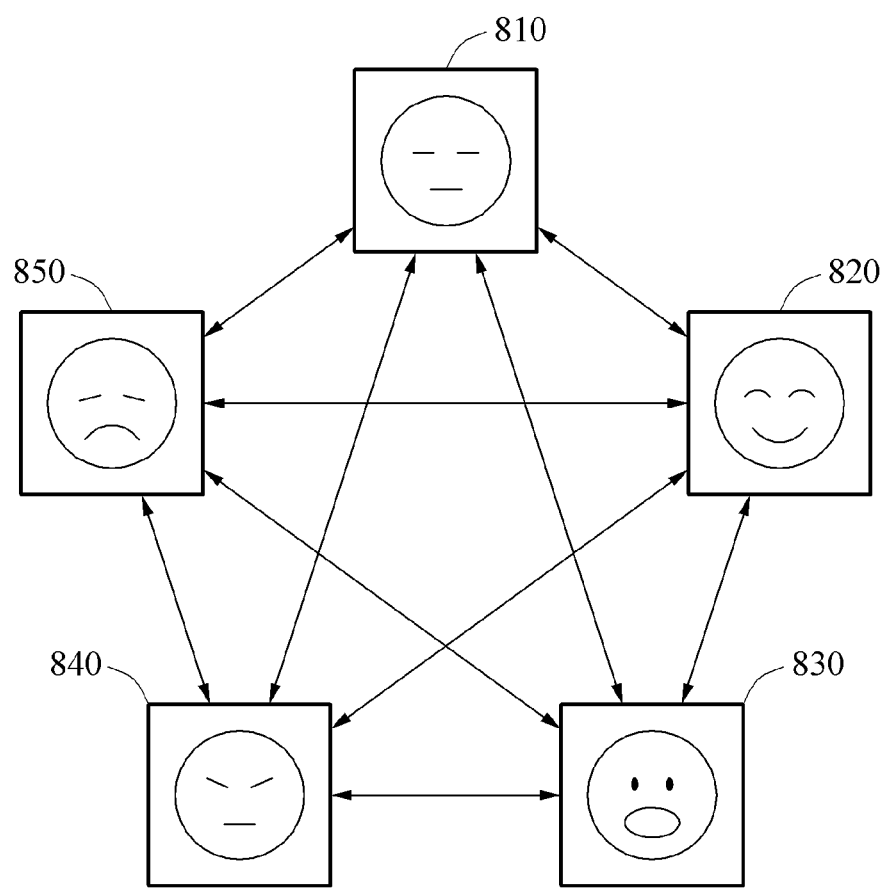

FIG. 8 illustrates an example of facial expression images generated from an input image. Referring to FIG. 8, an impassive facial expression image 810, a smiling facial expression image 820, a surprised facial expression image 830, an angry facial expression image 840, and a sad facial expression image 850 are illustrated.

When an input image, an index of the input image, and a switch index indicating a switch to a facial expression different from a facial expression of the input image are acquired, a facial expression generating apparatus generates facial expression images having different facial expressions that switch from the facial expression of the input image based on the index and the switch index. In an example, the generated facial expression images include facial expression images having different facial expression intensities corresponding to the facial expression of the input image and facial expression images having different facial expression intensities corresponding to the facial expression different from the facial expression of the input image. In an example, the generated facial expression images includes facial expression images having different facial expression intensities corresponding to facial expression variations among the different facial expressions that switch from the facial expression of the input image. A facial expression variation or a facial expression difference corresponding to the switch index is learned in advance.

For example, it may be assumed that an input image is the smiling facial expression image 820 with an index "3", a switch index indicates a switch to the angry facial expression image 840, and facial expression intensities corresponding to each facial expression image exist from an index "1" to an index "5".

The facial expression generating apparatus generates smiling facial expression images corresponding to indices "1", "2", "4", and "5" from the smiling facial expression image 820 with the index "3". Further, the facial expression generating apparatus generates angry facial expression images with indices "1" to "5" corresponding to the angry facial expression image 840 that switches from the smiling facial expression image 820. In addition, the facial expression generating apparatus generates facial expression images having different facial expression intensities corresponding to facial expression changes (for example, smiling facial expression→impassive facial expression→angry facial expression) between the smiling facial expression image 820 and the angry facial expression image 840 that switches from the smiling facial expression image 820.

For example, if the smiling facial expression image 820 changes to the angry facial expression image 840 via the surprised facial expression image 830, the facial expression generating apparatus also generates surprised facial expression images with indices "1" to "5" corresponding to the surprised facial expression image 830 corresponding to facial expression changes between the smiling facial expression image 820 and the angry facial expression image 840.

Figure 9:
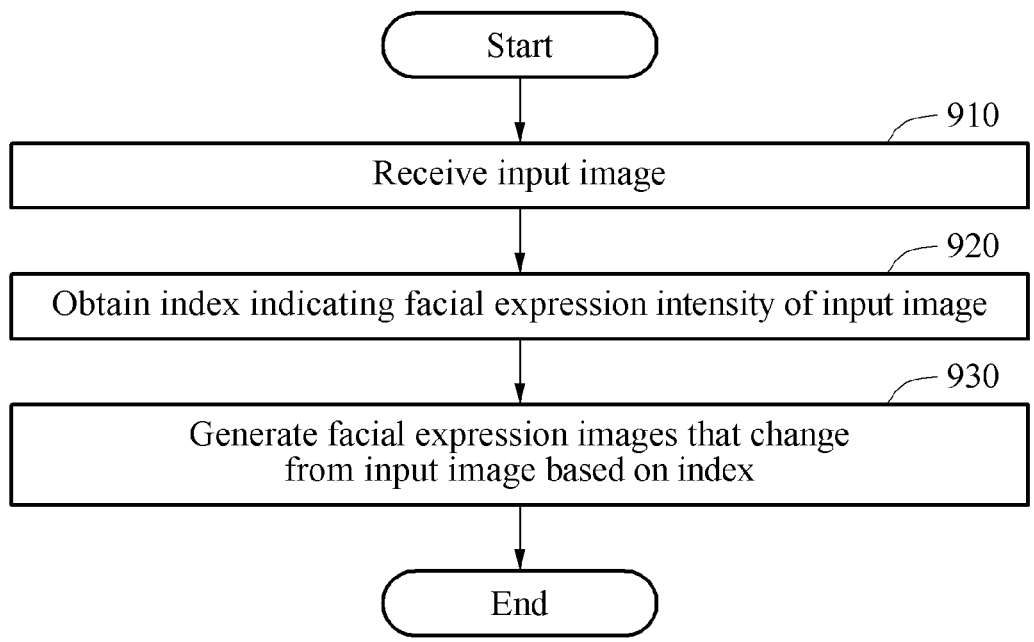
FIG. 9 is a diagram illustrating an example of a facial expression generating method.

FIG. 9 is a diagram illustrating an example of a facial expression generating method. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 is also applicable to FIG. 9, and are incorporated herein by reference. Thus, the above description may not be repeated here.

Referring to FIG. 9, in operation 910, a facial expression generating apparatus receives an input image. The input image includes an input image representing a first facial expression.

In operation 920, the facial expression generating apparatus obtains an index indicting a facial expression intensity of the input image. In an example, the index indicates a facial expression intensity ranging from "1" to "10" with respect to a first facial expression. In an example, the index includes a switch index that indicates a switch to a second or third facial expression different from the first facial expression. The facial expression generating apparatus receives the index from outside the facial expression generating apparatus, or obtains the index through direct estimation. A method of obtaining the index by the facial expression generating apparatus will be described with reference to FIG. 10.

In operation 930, the facial expression generating apparatus generates facial expression images that change from the input image based on the index. The plurality of facial expression images include facial expression images having different facial expression intensities corresponding to a facial expression of the input image, and facial images having different facial expression intensities corresponding to the facial expression different from the facial expression of the input image.

In operation 930, the facial expression generating apparatus generates facial expression images having facial expression intensities greater than the facial expression intensity based on neural networks corresponding to indices greater than the index, among forward-cascaded neural networks. Further, the facial expression generating apparatus generates facial expression images having facial expression intensities less than the facial expression intensity based on neural networks corresponding to indices less than the index, among backward-cascaded neural networks.

A method of generating facial expression images by the facial expression generating apparatus when an index indicating a facial expression intensity of an input image is obtained will be described with reference to FIG. 11. Further, a method of generating facial expression images by the facial expression generating apparatus when an index indicating a facial expression intensity of an input image and a switch index indicating a switch to a facial expression different from a facial expression of the input image are obtained will be described with reference to FIG. 12.

In an example, the facial expression generating apparatus generates a video based on the plurality of facial expression images, and plays back the video.

Figure 10:
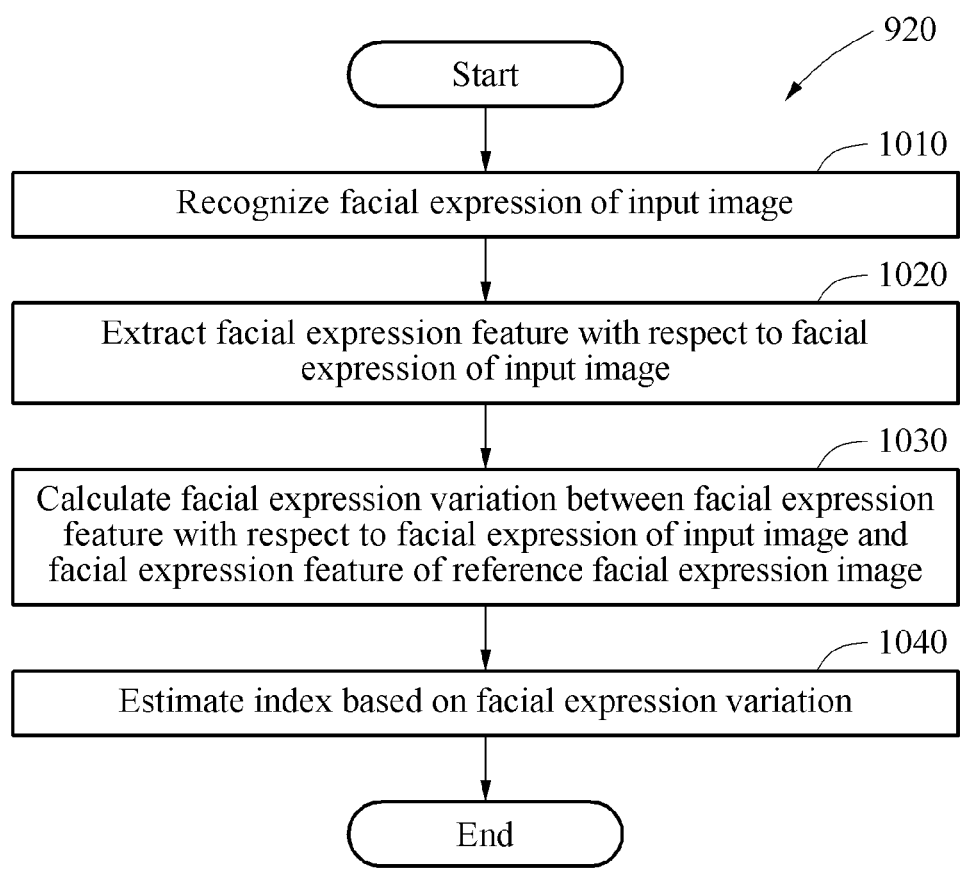
FIG. 10 is a diagram illustrating an example of a method of obtaining an index.

FIG. 10 is a diagram illustrating a method of obtaining an index in accordance with an embodiment. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 is also applicable to FIG. 10, and are incorporated herein by reference. Thus, the above description may not be repeated here.

Referring to FIG. 10, in operation 1010, the facial expression generating apparatus recognizes a facial expression of an input image. The facial expression generating apparatus recognizes a facial expression of a user shown in the input image based on a difference between the input image and a reference image. The facial expression generating apparatus recognizes the facial expression of the user from the input image using various methods.

In operation 1020, the facial expression generating apparatus extracts a facial expression feature with respect to the recognized facial expression. For example, the facial expression generating apparatus extracts the facial expression feature by detecting a landmark or action units of facial muscles with respect to the recognized facial expression.

In operation 1030, the facial expression generating apparatus calculates a facial expression variation between the facial expression feature with respect to the facial expression of the input image and a facial expression feature of a reference image corresponding to the recognized facial expression.

In operation 1040, the facial expression generating apparatus estimates an index based on the calculated facial expression variation.

In an example, the facial expression of the input image corresponds to an angry facial expression. The facial expression generating apparatus recognizes the angry facial expression of the input image, and extracts a facial expression feature with respect to the angry facial expression. The facial expression generating apparatus calculates a facial expression variation $2\varepsilon$ between the facial expression feature of the angry facial expression of the input image and a facial expression feature of a reference image (for example, an angriest facial expression image) with respect to the angry facial expression. In this example, when an index of the angriest facial expression image is "5", the facial expression generating apparatus estimates an index "3" that decreases by the facial expression variation 2ε from the index "5" as the index corresponding to the facial expression of the input image.

Figure 11:
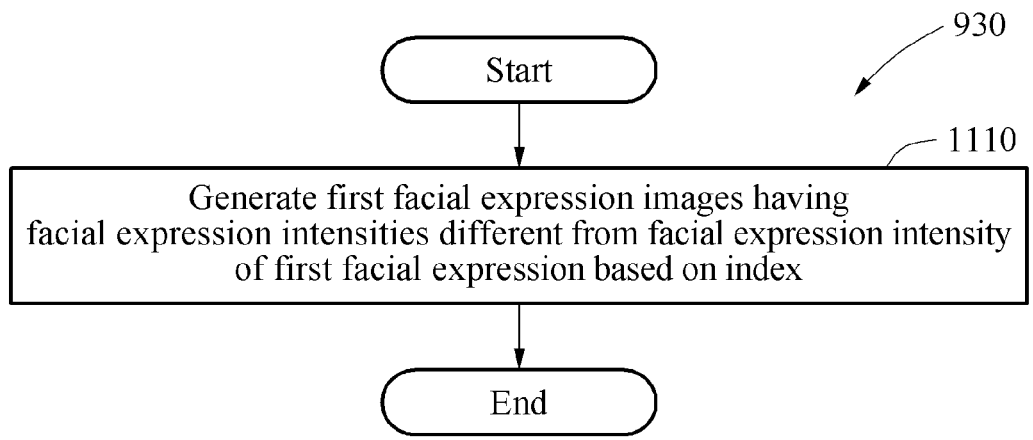
FIGS. 11 and 12 are diagrams illustrating examples of a method of generating facial expression images.

FIG. 11 is a diagram illustrating an example of a method of generating facial expression images. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 is also applicable to FIG. 11, and are incorporated herein by reference. Thus, the above description may not be repeated here.

Referring to FIG. 11, when an index is obtained, the facial expression generating apparatus generates first facial expression images having facial expression intensities different from a facial expression intensity of a first facial expression based on the index, in operation 1110.

For example, when a facial expression of an input image is a smiling facial expression, and there are facial expression intensities corresponding to an index "1" indicating an impassive facial expression, an index "2" indicating a faintly smiling facial expression, an index "3" indicating a smiling facial expression, an index "4" indicating a grinning facial expression, and an index "5" indicating a laughing facial expression.

In this example, when the obtained index is "2", the facial expression generating apparatus generates smiling facial expression images corresponding to the indices "3" to "5" based on the index "2".

Figure 12:
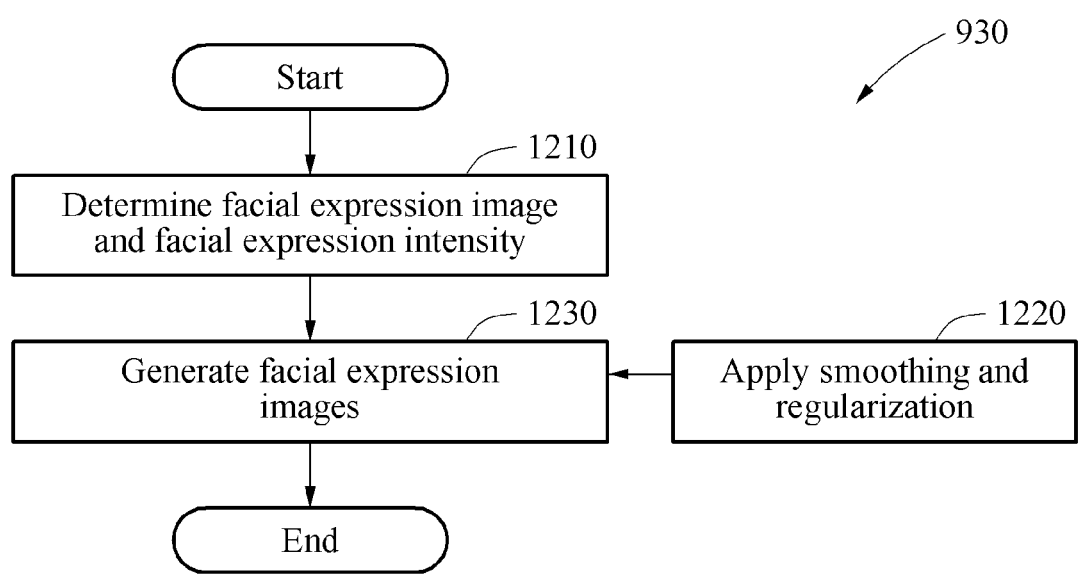

FIG. 12 is a diagram illustrating an example of a method of generating facial expression images. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the descriptions of FIGS. 1-11 is also applicable to FIG. 12, and are incorporated herein by reference. Thus, the above description may not be repeated here.

Referring to FIG. 12, in operation 1210, the facial expression generating apparatus determines a facial expression image and a facial expression intensity (or an index indicating the facial expression intensity). In an example, the index indicating the facial expression intensity includes an index indicating a facial expression intensity of the determined facial expression image, a switch index indicating a switch to a facial expression different from an initial facial expression, or both. A method of determining a facial expression image and a facial expression intensity by the facial expression generating apparatus will be further described with reference to FIG. 13.

In operation 1220, the facial expression generating apparatus smoothes and regularizes the determined facial expression image.

In operation 1230, the facial expression generating apparatus generates facial expression images based on the smoothed and regularized facial expression image and the switch index. In this example, the plurality of generated facial expression images include facial expression images having different facial expression intensities corresponding to facial expression changes between the facial expression (for example, angry facial expression) of the input image and a different facial expression (for example, smiling facial expression) that switches from the facial expression of the input image.

Figure 13:
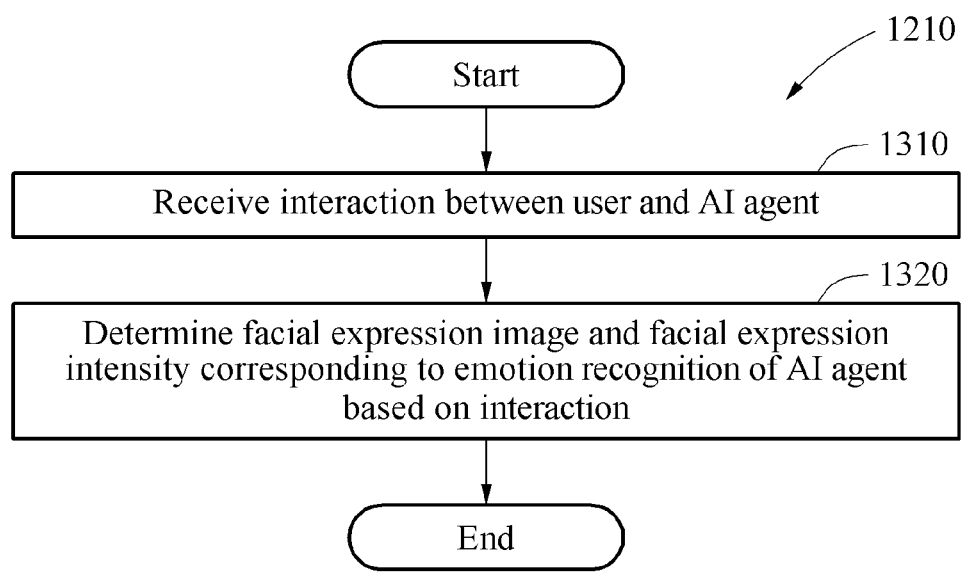
FIG. 13 is a diagram illustrating an example of a method of determining a facial expression image and a facial expression intensity.

FIG. 13 is a diagram illustrating an example of a method of determining a facial expression image and a facial expression intensity. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 is also applicable to FIG. 13, and are incorporated herein by reference. Thus, the above description may not be repeated here.

Referring to FIG. 13, in operation 1310, the facial expression generating apparatus receives an interaction between a user and an artificial intelligence (AI) agent. The interaction between the user and the AI agent includes a conversation, a text, and an image performed or exchanged between the user and the agent.

In operation 1320, the facial expression generating apparatus determines a facial expression image and a facial expression intensity corresponding to emotion recognition of the AI agent based on the received interaction.

In an example, based on the interaction between the user and the AI agent, an image of angry face and an angry voice of the user who complains to the AI agent may be received.

An emotion of the AI agent changes from joy to depression based on the angry face and the angry voice of the user. The facial expression generating apparatus recognizes that the emotion of the AI agent changed from joy to depression, and determines a switch index indicating a switch from a smiling facial expression corresponding to joy to a depressed facial expression based on the emotional change of the AI agent. For example, it may be assumed that a switch index of an impassive facial expression is "0", a switch index of a smiling facial expression is "2", a switch index of a depressed facial expression is "4", and a switch index of an angry facial expression is "6". The facial expression generating apparatus changes the switch index from "2" to "4" to change the facial expression from the smiling facial expression to the depressed facial expression.

The facial expression generating apparatus determines a depressed facial expression image, which is a facial expression image corresponding to the new emotion (depression) of the AI agent and a facial expression intensity. In this example, the facial expression intensity with respect to the depressed facial expression is determined in proportion to an intensity of the angry face and the angry voice of the user. When the face and the voice of the user represent a relatively low level of anger, the facial expression intensity of the depressed facial expression may be determined to be "2" or "3". When the face and the voice of the user represent a relatively high level of anger, the facial expression intensity of the depressed facial expression may be determined to be "5".

Figure 14:
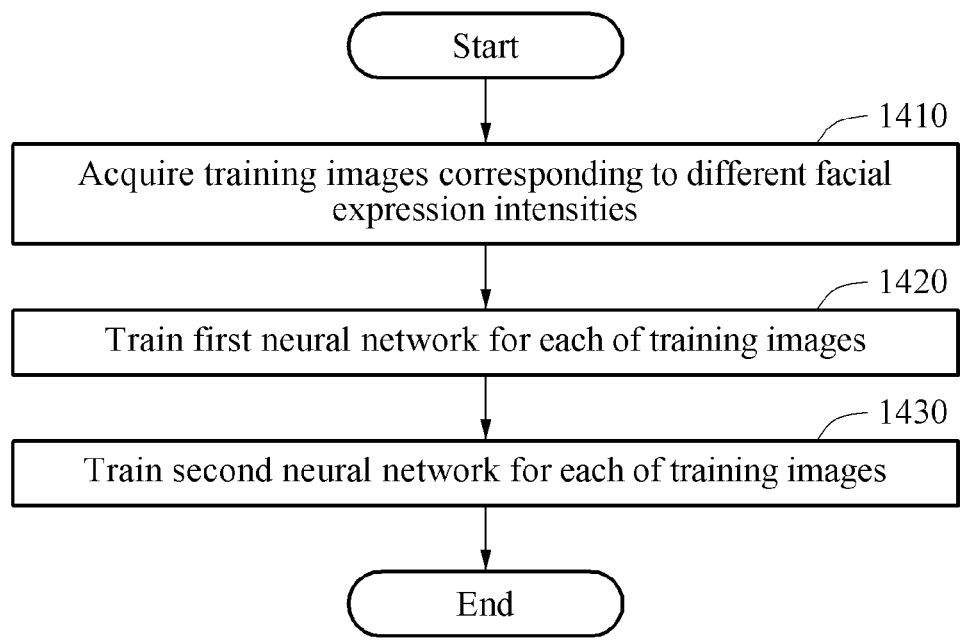
FIG. 14 is a diagram illustrating an example of a training method for generating a facial expression.

FIG. 14 is a diagram illustrating an example of a training method for generating a facial expression. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. One or more blocks of FIG. 14, and combinations of the blocks, can be implemented by special purpose hardware-based computer that perform the specified functions, or combinations of special purpose hardware and computer instructions. In addition to the description of FIG. 14 below, the descriptions of FIGS. 1-13 is also applicable to FIG. 14, and are incorporated herein by reference. Thus, the above description may not be repeated here.

Referring to FIG. 14, in operation 1410, a training apparatus acquires training images corresponding to different facial expression intensities.

In operation 1420, the training apparatus trains, for each of the training images, a first neural network that generates a subsequent image having a facial expression intensity greater than a facial expression intensity of the corresponding training image, among forward-cascaded neural networks. In an example, the training apparatus generates input images by applying element-wise operations to an output image of a previous neural network of the first neural network, among the forward-cascaded neural networks, and the corresponding training image. The training apparatus trains neural networks sharing parameters based on the input images and a training image subsequent to the corresponding training image, among the training images.

In operation 1430, the training apparatus trains, for each of the training images, a second neural network that generates a previous image having a facial expression intensity less than a facial expression intensity of the corresponding training image, among backward-cascaded neural networks. In an example, the training apparatus generates input images by applying element-wise operations to an output image of a subsequent neural network of the second neural network, among the backward-cascaded neural networks, and the corresponding training image. The training apparatus trains neural networks sharing parameters based on the plurality of input images and a training image previous to the corresponding training image, among the training images.

Figure 15:
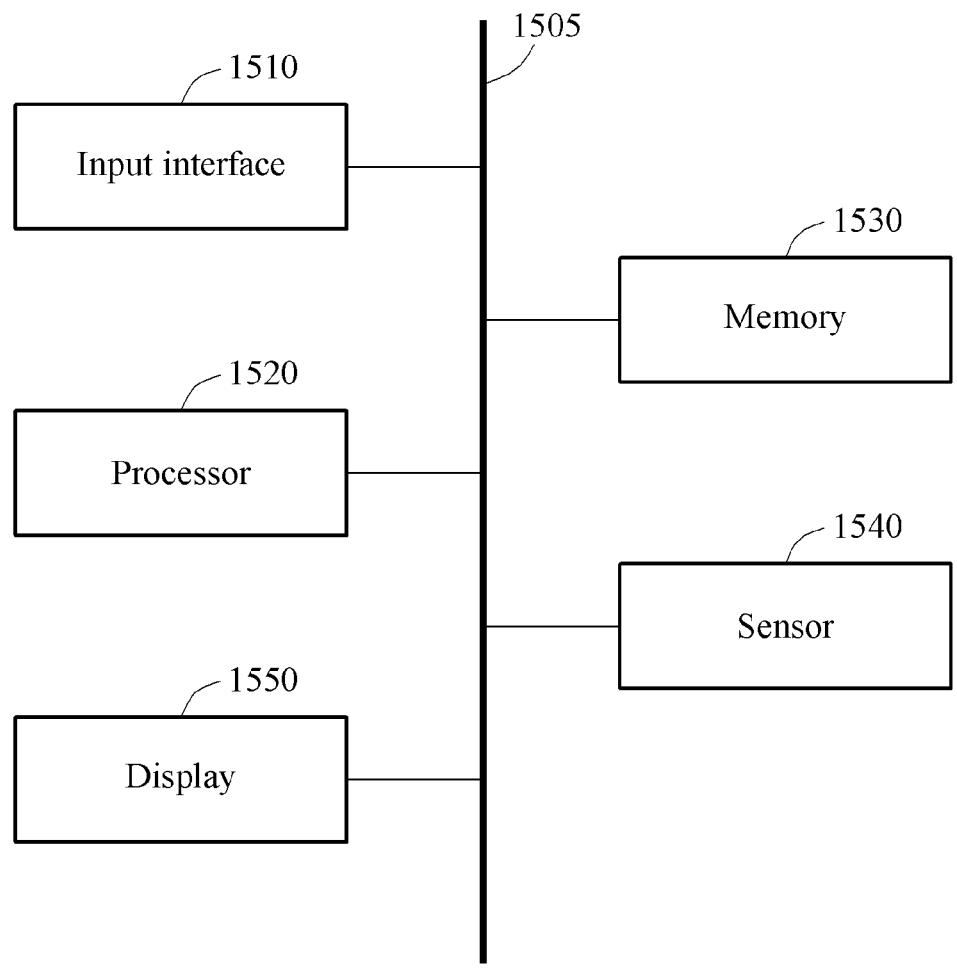
FIG. 15 is a diagram illustrating an example of a facial expression generating apparatus.

FIG. 15 is a diagram illustrating an example of a facial expression generating apparatus. Referring to FIG. 15, a facial expression generating apparatus 1500 includes an input interface 1510, a display 1550, and a processor 1520. The facial expression generating apparatus 1500 further includes a memory 1530 and a sensor 1540. The input interface 1510, the processor 1520, the memory 1530, the sensor 1540, the display 1550, and communicate with each other via a communication bus 1505.

The input interface 1510 receives an input image.

The processor 1520 obtains an index indicating a facial expression intensity of the input image, and generates facial expression images that change from the input image based on the index.

The processor 1520 generates facial expression images having facial expression intensities that sequentially change from the facial expression intensity corresponding to the index using facial expression generators. The facial expression generators include forward-cascaded neural networks and backward-cascaded neural networks.

The processor 1520 generates facial expression images having facial expression intensities greater than the facial expression intensity based on neural networks corresponding to indices greater than the index among the forward-cascaded neural networks. The processor 1520 generates facial expression images having facial expression intensities lesser than the facial expression intensity based on neural networks corresponding to indices less than the index among the backward-cascaded neural networks.

In an example, the processor 1520 performs at least one of the methods described with reference to FIGS. 1 through 14.

The memory 1530 stores computer-readable instructions. When the instructions stored in the memory 1530 are executed by the processor 1520, the processor 1520 processes the operations related to facial expression generation as described above. Further, the memory 1530 stores the generated facial expression images and information associated with generation of facial expression images. For example, the memory 1530 stores parameters related to facial expression generators, an encoder, and a decoder.

The sensor 1540 includes any one or any combination of an image sensor, a proximity sensor, or an infrared sensor configured to capture the input image. The sensor 1540 captures the input image using a scheme, such as, for example, a scheme of converting an optical image into an electrical signal. The sensor 1540 transmits at least one of the captured color image, the captured depth image, or the captured infrared image to at least one of the processor 1520 or the memory 1530.

The processor 1520 executes instructions or programs, or controls the facial expression generating apparatus 1500. In an example, the facial expression generating apparatus 1500 is connected to an external device (for example, personal computer (PC) or network) through an input/output device (not shown), and exchanges data with the external device. In an example, the facial expression generating apparatus 1500 is implemented in a variety of devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, a smart television (TV), a high definition television (HDTV), a smart appliance, an optical disc player, a DVD player, a Blue-ray player, a setup box, robot cleaners, a home appliance, a smart appliance, content players, communication systems, image processing systems, graphics processing systems, other consumer electronics/information technology (CE/IT) device, various Internet of Things (IoT) devices that are controlled through a network, a smart vehicle, an intelligent automobile, an autonomous driving vehicle, or any other device capable of wireless communication or network communication consistent with that disclosed herein. In addition to the description of FIG. 15, the descriptions of FIGS. 1-14 is also applicable to FIG. 14, and are incorporated herein by reference. Thus, the above description may not be repeated here The display 1550 displays the facial expression images received from the processor 1520. In an example, the display 1550 is a physical structure that includes one or more hardware components that provide the ability to render a user interface and/or receive user input. The display 1550 can encompass any combination of display region, gesture capture region, a touch sensitive display, and/or a configurable area. In an example, the display can be embedded in facial expression generating apparatus. In an example, the display 1550 is an external peripheral device that may be attached to and detached from the facial expression generating apparatus. The display 1550 may be a single-screen or a multi-screen display. A single physical screen can include multiple displays that are managed as separate logical displays permitting different content to be displayed on separate displays although part of the same physical screen. The display 1550 may also be implemented as an eye glass display (EGD), which includes one-eyed glass or two-eyed glasses. In an example, the display 1550 is a head-up display (HUD), a vehicular infotainment system, or a screen in the vehicle that uses augmented reality.

facial expression generating apparatus 110, 300, 400, the facial expression generators, and the The facial expression generating apparatus 110, 300, 400, the facial expression generators, and the apparatuses, units, modules, devices, and other components are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a facial expression, the method comprising:
    receiving an input image;
    obtaining an index indicating a facial expression intensity of the input image; and
    generating facial expression images, different from the input image, based on the index, wherein the generating of the facial expression images comprises;
        generating, using first neural networks, facial expression images having facial expression intensifies that are greater than the facial expression intensity of the input image, and
        generating, using second neural networks different from the first neural networks, facial expression images having facial expression intensifies that are less than the facial expression intensity of the input image.

2. The method of claim 1, wherein the input image comprises a first facial expression.

3. The method of claim 2, wherein the generating of the facial expression images further comprises generating the facial expression images to have facial expression intensities different from a facial expression intensity of the first facial expression based on the index.

4. The method of claim 1, wherein the generating of the facial expression images further comprises generating the facial expression images with facial expression intensities that sequentially change from the facial expression intensity indicated by the index.

5. The method of claim 1, wherein the first neural networks comprise forward-cascaded neural networks, and the second neural networks comprise backward-cascaded neural networks.

6. A method of generating a facial expression, the method comprising:
    receiving an input image;
    obtaining an index indicating a facial expression intensity of the input image;
    generating, based on the index, facial expression images having facial expression intensities greater than the facial expression intensity based on neural networks, among forward-cascaded neural networks, corresponding to indices greater than the index; and
    generating, based on the index, facial expression images having facial expression intensities less than the facial expression intensity based on neural networks, among backward-cascaded neural networks, corresponding to indices less than the index.

7. The method of claim 1, wherein the obtaining of the index comprises either one or both of receiving the index and determining the index.

8. The method of claim 7, wherein the determining of the index comprises:
    recognizing a facial expression of the input image; and
    determining the index indicating a facial expression intensity corresponding to the recognized facial expression.

9. The method of claim 8, wherein the determining of the index indicating the facial expression intensity comprises:
    extracting a facial expression feature of the recognized facial expression;
    calculating a facial expression variation between the facial expression feature and a facial expression feature of a reference image corresponding to the recognized facial expression; and
    estimating the index based on the facial expression variation.

10. The method of claim 1, further comprising:
    obtaining a switch index indicating a switch to a facial expression different from a facial expression of the input image,
    wherein the generating of the facial expression images further comprises generating the facial expression images based on the index and the switch index.

11. The method of claim 10, wherein the facial expression images comprise:
    first facial expression images having different facial expression intensities corresponding to the facial expression of the input image; and
    second facial expression images having different facial expression intensities corresponding to another facial expression different from the facial expression of the input image.

12. The method of claim 11, wherein the facial expression images have different facial expression intensities corresponding to facial expression changes between the facial expression and the another facial expression.

13. The method of claim 1, further comprising:
    generating a video based on the facial expression images; and
    playing back the video.

14. A non-transitory computer-readable medium storing instructions that, when executed by a processor, cause the processor to perform the method of claim 1.

15. A training method for generating a facial expression, the training method comprising:
    acquiring training images corresponding to different facial expression intensities;
    training, for each of the training images, a first neural network, among forward-cascaded neural networks, that generates a subsequent image having a facial expression intensity greater than a facial expression intensity of the corresponding training image; and training, for each of the training images, a second neural networks, among backward-cascaded neural networks, that generates a previous image having a facial expression intensity less than a facial expression intensity of the corresponding training image.

16. The training method of claim 15, wherein the training of the first neural network comprises:

generating input images by applying element-wise operations to an output image of a previous neural network of the first neural network, among the forward-cascaded neural networks, and the corresponding training image; and training neural networks sharing parameters based on the input images and a training image subsequent to the corresponding training image, among the training images.

17. The training method of claim 15, wherein the training of the second neural network comprises:

generating input images by applying element-wise operations to an output image of a subsequent neural network of the second neural network, among the backward-cascaded neural networks, and the corresponding training image; and training neural networks sharing parameters based on the input images and a training image previous to the corresponding training image, among the training images.

18. An apparatus for generating a facial expression, the apparatus comprising:

an input interface configured to receive an input image; and a processor configured to obtain an index indicating a facial expression intensity of the input image, and to generate facial expression images different from the input image, based on the index, by:

generating, using first neural networks, facial expression images having facial expression intensities that are greater than the facial expression intensity of the input image, and generating, using second neural networks different from the first neural networks, facial expression images having facial expression intensities that are less than the facial expression intensity of the input image.

19. The apparatus of claim 18, wherein the processor is further configured to generate the facial expression images with facial expression intensities that sequentially change from the facial expression intensity indicated by the index, and wherein the first neural networks comprise forward-cascaded neural networks, and the second neural networks comprise backward-cascaded neural networks.

20. The apparatus of claim 18, wherein the first neural networks comprise forward-cascaded neural networks corresponding to indices greater than the index, and the second neural networks comprise backward-cascaded neural networks corresponding to indices less than the index.

21. The method of claim 1, wherein the first neural networks correspond to indices greater than the index, and the second neural networks correspond to indices less than the index.

* * * * *